United States Patent
Ikeda et al.

(10) Patent No.: US 11,715,986 B2
(45) Date of Patent: Aug. 1, 2023

(54) MOTOR INCLUDING WINDING INCLUDING INNER BENT PORTION AND OUTER BENT PORTION AND METHOD OF MANUFACTURING MOTOR

(71) Applicant: DENSO CORPORATION, Kariya (JP)

(72) Inventors: Shinji Ikeda, Kosai (JP); Takumi Nagaya, Toyohashi (JP); Tatsuya Takagi, Hamamatsu (JP); Kuniaki Matsumoto, Chiryu (JP); Kazuhiro Hosotani, Hamamatsu (JP); Yutaro Yagi, Toyohashi (JP); Yoshihiko Suga, Kosai (JP); Takuya Matsumoto, Kosai (JP); Shunichi Hiraoka, Kosai (JP)

(73) Assignee: DENSO CORPORATION, Kariya (JP)

( * ) Notice: Subject to any disclaimer, the term of this patent is extended or adjusted under 35 U.S.C. 154(b) by 129 days.

(21) Appl. No.: 17/361,732

(22) Filed: Jun. 29, 2021

(65) Prior Publication Data

US 2021/0328476 A1 Oct. 21, 2021

Related U.S. Application Data

(63) Continuation of application No. 16/082,540, filed as application No. PCT/JP2017/008792 on Mar. 6, 2017, now Pat. No. 11,088,585.

(30) Foreign Application Priority Data

Mar. 9, 2016 (JP) .................. 2016-045700
Mar. 9, 2016 (JP) .................. 2016-045701

(51) Int. Cl.
*H02K 5/10* (2006.01)
*H02K 5/22* (2006.01)
(Continued)

(52) U.S. Cl.
CPC ............ *H02K 5/10* (2013.01); *H02K 1/146* (2013.01); *H02K 1/2788* (2022.01); *H02K 5/22* (2013.01);
(Continued)

(58) Field of Classification Search
CPC .. H02K 3/28; H02K 3/24; H02K 3/00; H02K 3/04; H02K 3/12; H02K 3/18;
(Continued)

(56) References Cited

U.S. PATENT DOCUMENTS 4,115,915 A 9/1978 Godfrey
4,535,373 A 8/1985 Schuh
(Continued)

FOREIGN PATENT DOCUMENTS

CN 103683617 A 3/2014
CN 103746488 A 4/2014
(Continued)

OTHER PUBLICATIONS

English language translation of the following: Office action dated Nov. 19, 2019 from the JPO in a Japanese patent application No. 2016-045701 corresponding to the instant patent application.
(Continued)

*Primary Examiner* — Maged M Almawri
(74) *Attorney, Agent, or Firm* — Solaris Intellectual Property Group, PLLC

(57) ABSTRACT

A motor includes a rotor and a stator including a stator core and a winding including a first extension extending with respect to the stator core toward one side in a rotation-axis direction of the rotor, a second extension extending toward a rotation-radial direction outside of the rotor from an end of the first extension on the one side in the rotation-axis direction, and a third extension extending toward the one side in the rotation-axis direction from an end at the rotor (Continued)

rotation-radial direction outside of the second extension, and connected to a circuit device, and the winding forming a coil around the stator core, and such that an inner bent portion at a boundary between the first and second extensions is disposed at the one side in the rotation-axis direction with respect to an outer bent portion at a boundary between the second and third extensions.

11 Claims, 13 Drawing Sheets

(51) Int. Cl.
    H02K 11/05    (2016.01)
    H02K 1/2788   (2022.01)
    H02K 11/30    (2016.01)
    H02K 1/14     (2006.01)
    H02K 15/00    (2006.01)
    H02K 15/02    (2006.01)
    H02K 21/22    (2006.01)

(52) U.S. Cl.
    CPC ............ *H02K 5/225* (2013.01); *H02K 11/05* (2016.01); *H02K 11/30* (2016.01); *H02K 15/0031* (2013.01); *H02K 15/0062* (2013.01); *H02K 15/022* (2013.01); *H02K 21/22* (2013.01)

(58) Field of Classification Search
    CPC ............ H02K 3/325; H02K 3/34; H02K 3/46; H02K 3/50; H02K 3/505; H02K 3/52; H02K 3/522; H02K 2203/06; H02K 2203/09; H02K 5/10; H02K 5/22; H02K 5/225; H02K 11/05; H02K 11/30; H02K 1/146; H02K 21/22; H02K 15/0031; H02K 15/0062; H02K 15/022
    USPC ............................................ 310/179–208, 71
    See application file for complete search history.

(56) References Cited

U.S. PATENT DOCUMENTS

| | | | |
|---|---|---|---|
| 4,720,646 A | 1/1988 | Torimoto | |
| 4,894,738 A | 1/1990 | Elsasser et al. | |
| 5,173,814 A | 12/1992 | Elsasser et al. | |
| 5,291,087 A | 3/1994 | Rollick et al. | |
| 5,394,043 A | 2/1995 | Hsia | |
| 5,448,117 A | 9/1995 | Elliott | |
| 5,548,458 A | 8/1996 | Pelstring et al. | |
| 5,659,217 A | 8/1997 | Petersen | |
| 5,685,062 A | 11/1997 | McCarthy et al. | |
| 5,806,169 A | 9/1998 | Trago et al. | |
| 5,874,796 A | 2/1999 | Petersen | |
| 5,998,892 A | 12/1999 | Smith et al. | |
| 6,137,202 A * | 10/2000 | Holmes ................ | H02K 3/522 29/598 |
| 6,501,200 B2 | 12/2002 | Engel et al. | |
| RE38,662 E | 11/2004 | Elsasser et al. | |
| 7,474,024 B2 | 1/2009 | Nakanishi | |
| 7,646,131 B2 * | 1/2010 | Georg ................... | H02K 29/03 310/216.069 |
| 8,390,159 B2 * | 3/2013 | Koike .................... | H02K 3/12 310/260 |
| 8,519,582 B2 | 8/2013 | Leung et al. | |
| 9,577,498 B2 * | 2/2017 | Isoda ................... | H02K 15/022 |
| 9,729,030 B2 * | 8/2017 | Isoda ................... | H02K 3/32 |
| 10,389,198 B2 | 8/2019 | Iki | |
| 11,063,487 B2 * | 7/2021 | Koga ................... | H02K 3/04 |
| 2002/0089242 A1 | 7/2002 | Liang et al. | |
| 2004/0135440 A1 * | 7/2004 | Higashino .............. | H02K 7/04 310/254.1 |
| 2004/0145250 A1 | 7/2004 | Kudo et al. | |
| 2006/0267431 A1 | 11/2006 | Johnson et al. | |
| 2006/0279162 A1 | 12/2006 | Achor et al. | |
| 2007/0252454 A1 | 11/2007 | Hayashi et al. | |
| 2007/0273225 A1 | 11/2007 | Head | |
| 2008/0115527 A1 | 5/2008 | Doty et al. | |
| 2009/0200888 A1 * | 8/2009 | Tanaka .................. | H02K 3/12 310/195 |
| 2010/0187918 A1 * | 7/2010 | Takahashi .............. | H02K 3/522 310/43 |
| 2010/0201212 A1 * | 8/2010 | Urano .................... | H02K 3/18 310/71 |
| 2010/0207467 A1 * | 8/2010 | Urano .................... | H02K 3/522 310/71 |
| 2010/0275436 A1 * | 11/2010 | Kiyono ................. | H02K 15/12 29/596 |
| 2010/0327680 A1 * | 12/2010 | Miyachi ............... | H02K 11/028 310/71 |
| 2011/0239442 A1 * | 10/2011 | Utaka ................ | H02K 15/0037 29/596 |
| 2011/0241462 A1 * | 10/2011 | Utaka .................... | H02K 3/12 310/71 |
| 2012/0068557 A1 | 3/2012 | Duesing et al. | |
| 2012/0269666 A1 | 10/2012 | Lin et al. | |
| 2012/0286593 A1 * | 11/2012 | Yokogawa ............. | H02K 1/278 310/43 |
| 2012/0319543 A1 | 12/2012 | Adachi et al. | |
| 2013/0207491 A1 | 8/2013 | Hatfield et al. | |
| 2013/0313921 A1 | 11/2013 | Hoffman et al. | |
| 2014/0015358 A1 | 1/2014 | Wan et al. | |
| 2014/0070646 A1 * | 3/2014 | Isoda ................. | H02K 15/0062 310/71 |
| 2014/0099217 A1 | 4/2014 | McCormick et al. | |
| 2014/0125173 A1 * | 5/2014 | Hayashi ................ | H02K 5/10 310/88 |
| 2014/0339938 A1 | 11/2014 | Passman et al. | |
| 2015/0128406 A1 * | 5/2015 | Isoda .................... | H02K 3/325 29/596 |
| 2015/0155750 A1 * | 6/2015 | Hashimoto ............ | H02K 1/02 310/43 |
| 2015/0207374 A1 * | 7/2015 | Tsuiki .................... | H02K 3/12 310/202 |
| 2015/0222156 A1 * | 8/2015 | Tomizawa .............. | H02K 5/10 310/88 |
| 2016/0043604 A1 * | 2/2016 | Yoshida ................ | H02K 3/325 310/71 |
| 2016/0276895 A1 | 9/2016 | Aizawa et al. | |
| 2016/0336831 A1 * | 11/2016 | Horizumi .............. | H02K 11/33 |
| 2017/0302139 A1 * | 10/2017 | Sakai .................... | F04C 29/047 |
| 2017/0317562 A1 | 11/2017 | Asano et al. | |
| 2018/0115211 A1 * | 4/2018 | Nakamura ............. | H02K 3/18 |
| 2019/0273421 A1 | 9/2019 | Velderman et al. | |
| 2019/0348885 A1 * | 11/2019 | Hattori ................. | B62D 5/0403 |

FOREIGN PATENT DOCUMENTS

| | | |
|---|---|---|
| JP | H04-134124 U | 12/1992 |
| JP | 2002-64028 A | 2/2002 |
| JP | 2014-057403 A | 3/2014 |
| JP | 2014-204477 A | 10/2014 |
| JP | 2015-142455 A | 8/2015 |

OTHER PUBLICATIONS

English language translation of the following: Office action dated May 12, 2020 from the SIPO in a Chinese patent application No. 201780015376.1 corresponding to the instant patent application.
Non-Final Office Action issued by USPTO dated Dec. 22, 2020, in related U.S. Appl. No. 16/082,540.
Notice of Allowance issued by USPTO dated Apr. 16, 2021, in related U.S. Appl. No. 16/082,540.

* cited by examiner

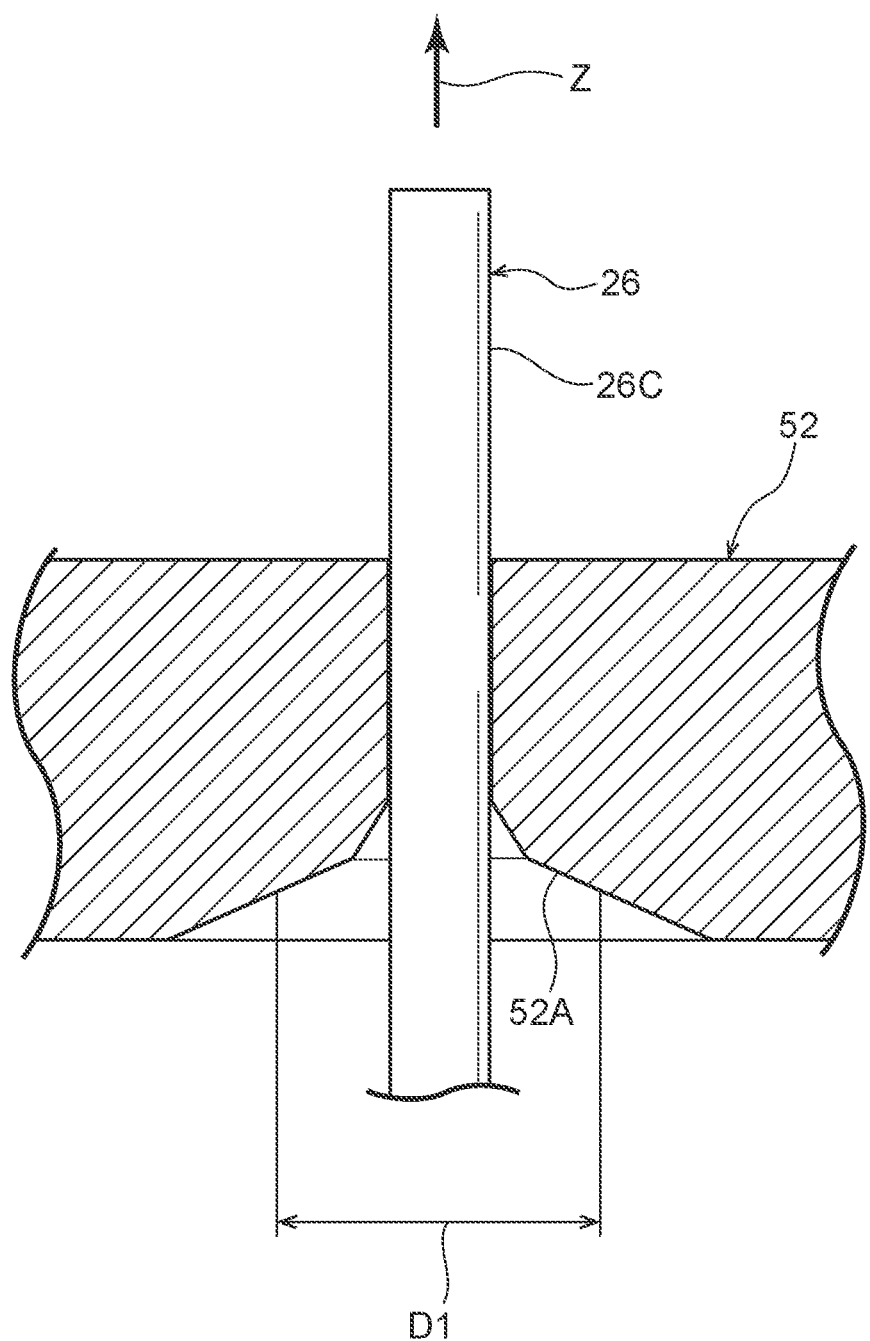

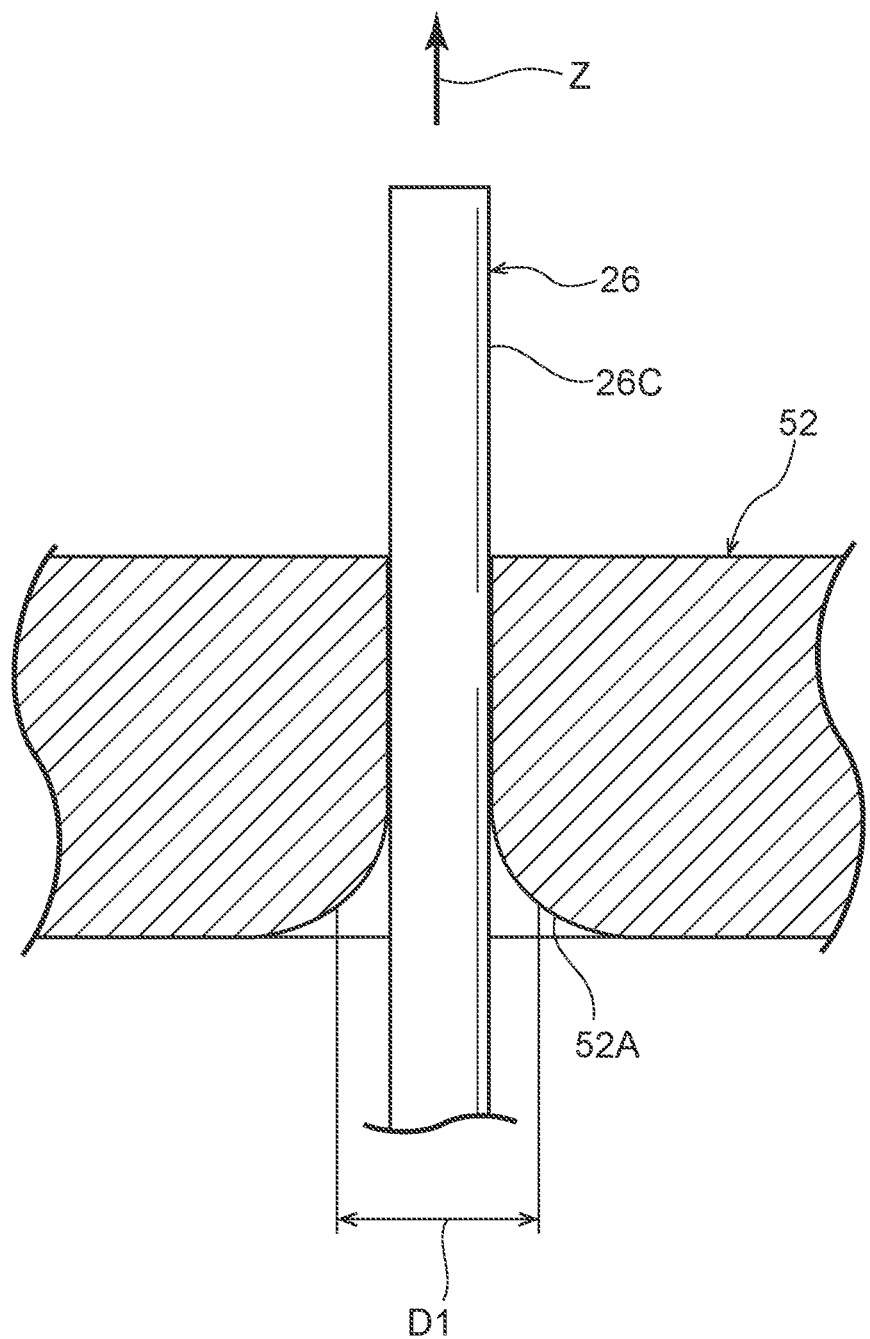

MOTOR INCLUDING WINDING INCLUDING INNER BENT PORTION AND OUTER BENT PORTION AND METHOD OF MANUFACTURING MOTOR

CROSS-REFERENCE TO RELATED APPLICATIONS

This application is a continuation application of, and claims priority to, U.S. application Ser. No. 16/082,540, filed Sep. 6, 2018, which is a national stage entry of International Application No. PCT/JP2017/008792 filed Mar. 6, 2017, and claims priority from Japanese Patent Application No. 2016-045700 filed Mar. 9, 2016 and Japanese Patent Application No. 2016-045701 filed Mar. 9, 2016. The disclosures of all of the above applications are incorporated herein by reference in their entireties.

FIELD

The present disclosure relates to a motor and a method of manufacturing a motor.

BACKGROUND

Japanese Patent Application Laid-Open (JP-A) No. 2015-142455 discloses a brushless motor that includes a stator including coils formed by winding windings around a stator core, a rotor that rotates under the influence of a rotating magnetic field from the stator, a circuit device that controls current flow to the windings, and a base to which the stator and the circuit device is fixed. In this brushless motor, the circuit device is fixed to an opposite side of the base to the side on which the stator is fixed. Openings are accordingly formed in the base to lead terminal ends of the windings that are wound around the stator core to the circuit device side of the base.

However, depending on the environment in which the brushless motor is used, it may be necessary to suppress water droplets adhered to the stator side of the base from infiltrating to the circuit device side through the openings formed in the base. Accordingly, in the brushless motor described in JP-A 2015-142455, an insulator is provided between the openings formed in the base and the windings inserted through the openings to suppress water droplets adhered to the stator side of the base from infiltrating to the circuit device side.

JP-A 2014-204477 also discloses a brushless motor that includes a stator including coils formed by winding windings around a stator core, a rotor that rotates under the influence of a rotating magnetic field from the stator, and a circuit device that controls current flow to the windings. In this brushless motor, terminal ends of the windings are bent and joined to circuit terminals of the circuit device.

However, the shape and wiring routing of locations of the windings between the stator core and the circuit device may influence the build shape along a rotation axis direction of the rotor.

SUMMARY

The present disclosure obtains a motor capable of suppressing water droplets adhered to a stator side from infiltrating to a circuit device side.

The present disclosure further obtains a motor capable of suppressing the build shape along a rotation axis direction from becoming more bulky, and a method of manufacturing a motor thereof.

A first aspect of the present disclosure is a motor including a stator, a rotor, a centerpiece, a circuit device, and a potting section. The stator includes a coil formed from a wound winding that is configured by a conductive member including an insulating covering layer on the surface of the conductive member. The rotor rotates under the influence of a rotating magnetic field generated by the stator. The centerpiece supports the stator and is formed with a centerpiece-side winding insertion hole through which the winding is inserted. The circuit device is disposed on an opposite side of the centerpiece to a side on which the stator is fixed, includes a connection portion to which the winding is connected after having passed through the centerpiece-side winding insertion hole, and controls current flow to the winding. The potting section is formed using potting material, and seals a gap formed between the centerpiece-side winding insertion hole and the winding by achieving a state in which a portion of the potting section is closely adhered to the covering layer of the winding.

According to the first aspect, the stator generates a rotating magnetic field by controlling the current flow to the winding that is connected to the connection portion of the circuit device. The rotor is rotated under the influence of the rotating magnetic field. In the first aspect, the winding is inserted through the centerpiece-side winding insertion hole formed in the centerpiece supporting the stator. Moreover, the gap formed between the centerpiece-side winding insertion hole and the winding is sealed by the potting section formed using the potting material. Water droplets adhered to the stator side can thereby be suppressed from infiltrating through the centerpiece-side winding insertion hole to the circuit device side. In particular, in the first aspect, a good state of joining between the potting section and the winding can be achieved due to the potting section being configured closely adhered to the covering layer of the winding. This enables water droplets adhered to the stator side to be suppressed from infiltrating through between the potting section and the winding to the circuit device side.

A second aspect of the present disclosure is the motor of the first aspect, wherein plural of the centerpiece-side winding insertion holes are formed in the centerpiece, and each gap formed between the plural the centerpiece-side winding insertion holes and the respective windings inserted through the plural respective centerpiece-side winding insertion holes is sealed by the single potting section.

According to the second aspect, good work efficiency can be achieved when forming the potting section to seal the respective gaps due to the configuration in which every one of the gaps is sealed by the single potting section.

A third aspect of the present disclosure is the motor of the first aspect or the second aspect, wherein a recess is formed in the centerpiece so as to open toward one side in a rotation axis direction of the rotor, and the centerpiece-side winding insertion hole is formed in a bottom of the recess.

According to the third aspect, the potting material for forming the potting section can be held inside the recess due to the configuration in which the centerpiece-side winding insertion hole is formed in the bottom of the recess. This enables good work efficiency to be achieved when forming the potting section to seal the gaps formed between the centerpiece-side winding insertion hole and the winding.

A fourth aspect of the present disclosure is the motor of the third aspect, wherein plural of the centerpiece-side winding insertion holes are formed in the bottom of the single recess.

According to the fourth aspect, even better work efficiency can be achieved when forming the potting section to seal the gap formed between the centerpiece-side winding insertion hole and the winding due to forming the plural centerpiece-side winding insertion holes in the bottom of the single recess.

A fifth aspect of the present disclosure is the motor of one of the first to the fourth aspects, wherein an insulating cap is provided between the centerpiece-side winding insertion hole and the winding, a cap-side winding insertion hole through which the winding is inserted is formed in the insulating cap, and a stator-side portion of the cap-side winding insertion hole has an inner diameter that becomes smaller on progression from the stator side to the circuit device side.

According to the fifth aspect, the state of insulation between the winding and the peripheral edge of the centerpiece-side winding insertion hole can be easily secured due to providing the insulating cap between the centerpiece-side winding insertion hole and the winding. Moreover, the winding can be easily inserted through from the stator side to the circuit-device side due to the stator-side portion of the cap-side winding insertion hole formed in the cap having an inner diameter that becomes smaller on progression from the stator side to the circuit device side.

A sixth aspect of the present disclosure is the motor of the fifth aspect, wherein a circuit-device-side portion of the cap-side winding insertion hole has an inner diameter larger than an inner diameter of the cap-side winding insertion hole at a central portion in a rotation axis direction of the rotor, and the potting section is provided on the circuit device side of the centerpiece.

According to the sixth aspect, contact area between the potting section and the covering layer formed on the winding can be increased due to making the inner diameter of the portion on the circuit-device-side of the cap-side winding insertion hole formed in the cap larger than the inner diameter of the central portion of the cap-side winding insertion hole along the rotation axis direction of the rotor. This enables the join strength between the potting section and the covering layer formed to the winding to be raised.

A seventh aspect of the present disclosure is a motor including (1) a rotor that includes a rotor magnet and that is supported so as to be capable of rotating about an axis, and (2) a stator. The stator includes (i) a stator core disposed facing the rotor magnet along a rotation radial direction of the rotor, and (ii) a winding. The winding includes a first extension that extends with respect to the stator core toward one side in a rotation axis direction of the rotor, a second extension that extends toward a rotation radial direction outside of the rotor from an end of the first extension on the one side in the rotation axis direction of the rotor, and a third extension that extends toward the one side in the rotation axis direction of the rotor from an end at the rotor rotation radial direction outside of the second extension, and that is connected to a circuit device. The winding forms a coil around the stator core, and a boundary between the first extension and the second extension is disposed at the one side in the rotation axis direction of the rotor with respect to a boundary between the second extension and the third extension.

According to the seventh aspect, a magnetic field around the stator core arises due to current flow from the circuit device to the winding forming the coil. Namely, the stator causes generation of the rotating magnetic field. The rotor is rotated about the axis by interaction between the rotating magnetic field and the magnetic field of the rotor magnet. In the seventh aspect, the boundary between the first extension and the second extension on a section of the winding extending from the stator core is disposed at the one side in the rotation axis direction of the rotor with respect to the boundary between the second extension and the third extension on this extension section. Thereby, a location on the stator at the rotor rotation radial direction outside can be disposed closer to a member disposed at the one side of the stator in the rotor rotation axis direction than in a configuration in which the boundary between the first extension and the second extension and the boundary between the second extension and the third extension are disposed at the same position in the rotation axis direction of the rotor. As a result, the build shape of the motor in the rotation axis direction can be suppressed from becoming bulky.

An eighth aspect of the present disclosure is the motor of the seventh aspect, wherein the second extension is inclined toward another side in the rotation axis direction of the rotor on progression toward the rotor rotation radial direction outside.

According to the eighth aspect, the second extension, which is the location between first extension and the third extension, is inclined as described above. Due to adopting such a configuration, the length of the second extension can be made shorter than in cases in which the second extension is curved. This enables the wiring routing of the windings for the portion extending from the stator core as far as the circuit device to be suppressed from increasing in length.

A ninth aspect of the present disclosure is a method applicable to manufacturing the motor of the seventh aspect or the eighth aspect. This motor manufacturing method includes: forming a coil by winding a winding around the stator core to form the coil around the stator core; bending a winding by pressing a section of the coil-forming winding extending out from the stator core so as to form the first extension, the second extension, and the third extension such the boundary between the first extension and the second extension is disposed on the one rotation axis direction side of the rotor with respect to the boundary between the second extension and the third extension; and connecting the winding by connecting the third extension to the circuit device.

In the ninth aspect, first the coil wound around the stator core is formed by winding the winding around the stator core (coil forming process). Then the portion of winding forming the coil and extending out from the stator core is pressed. The first extension that extends with respect to the stator core toward one side in a rotation axis direction of the rotor, the second extension that extends toward a rotation radial direction outside of the rotor from an end of the first extension on the one side in the rotation axis direction of the rotor, and the third extension that extends toward the one side in the rotation axis direction of the rotor from an end at the rotor rotation radial direction outside of the second extension, are formed thereby. The boundary between the first extension and the second extension is also thereby disposed on the one rotation axis direction side of the rotor with respect to the boundary between the second extension and the third extension (winding bending process). Then the third extension of the winding is connected to the circuit device (winding connection process). The motor of the seventh or eighth aspect is manufactured by performing the above processes, and is capable of suppressing the build shape of the motor in the rotation axis direction from becoming bulky.

A tenth aspect of the present disclosure is a motor manufacturing method of the ninth aspect, further including turning the winding after bending the winding by swinging the second extension about the third extension so as to dispose the third extension at a position corresponding to the centerpiece-side winding insertion hole, and attaching the stator to the centerpiece. The stator is supported by a centerpiece formed with a centerpiece-side winding insertion hole through which the third extension is inserted.

According to the tenth aspect, after performing the winding bending process, the third extension of the winding is disposed at a position corresponding to the centerpiece-side winding insertion hole formed in the centerpiece by swinging the second extension of the winding about the third extension (winding turning process). Then, the stator is attached to the centerpiece (stator attaching process). Thus in the tenth aspect, the third extension of the winding can be inserted easily into the centerpiece insertion hole formed in the centerpiece when the stator is attached to the centerpiece by performing the winding turning process.

BRIEF DESCRIPTION OF THE DRAWINGS

FIG. 11 is an enlarged cross-section illustrating a cap-side winding insertion hole of a cap according to a first modified example.

FIG. 12 is an enlarged cross-section corresponding to FIG. 11 and illustrating a cap-side winding insertion hole of a cap according to a second modified example.

DETAILED DESCRIPTION

Explanation follows regarding a motor according to an exemplary embodiment of the present disclosure, with reference to FIG. 1 to FIG. 5.

Figure 1:
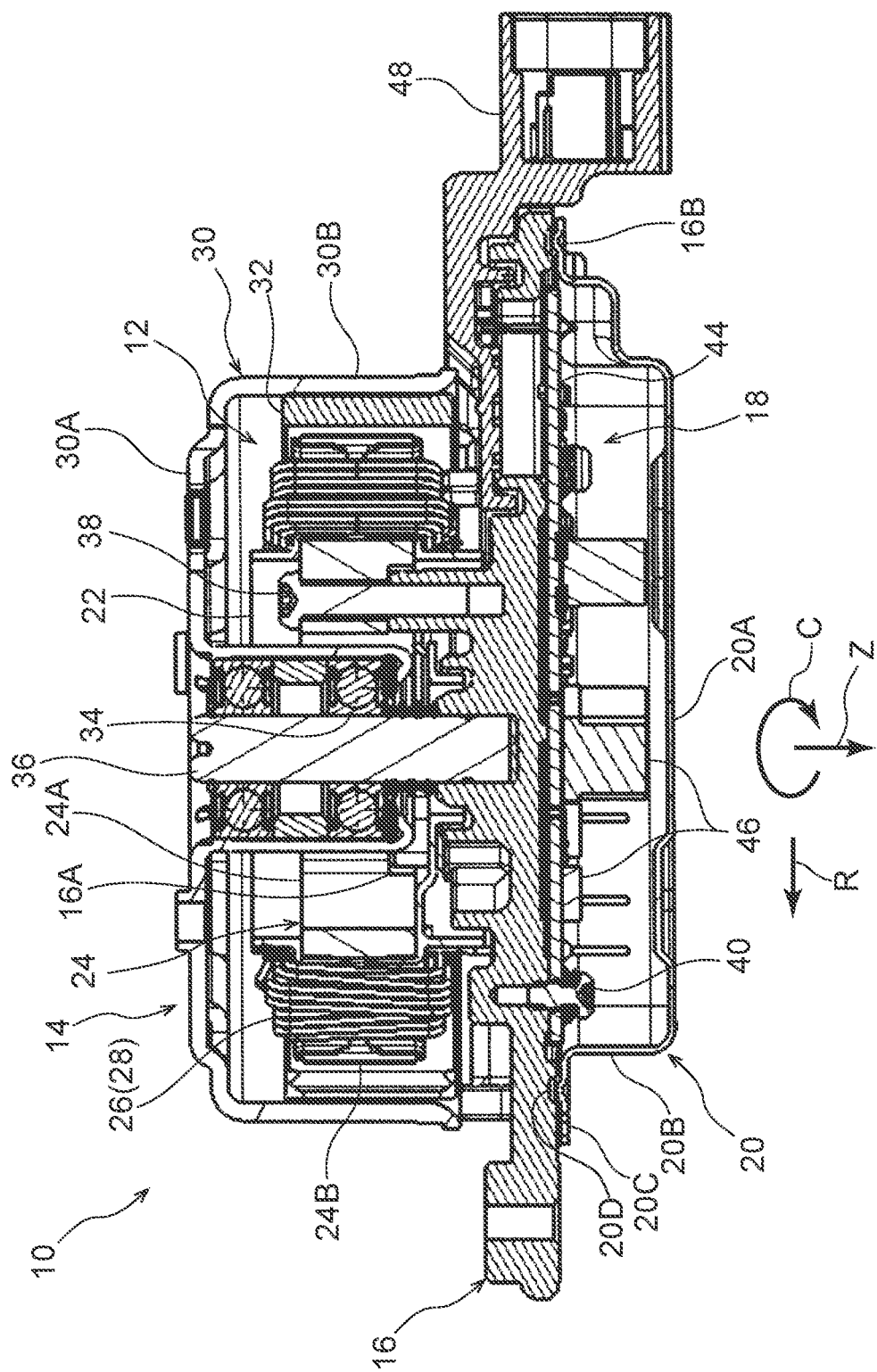
FIG. 1 is a side view cross-section illustrating a brushless motor.

As illustrated in FIG. 1, a motor unit 10, serving as a motor in the present exemplary embodiment, includes a stator 12, a rotor 14, a centerpiece 16, a circuit device 18, and a cover 20. The stator 12 generates a rotating magnetic field. The rotor 14 is rotated by the rotating magnetic field generated by the stator 12. The centerpiece 16 supports the rotor 14, the stator 12, and the like. The circuit device 18 controls rotation of the rotor 14 by controlling current flow to windings 26 configuring part of the stator 12. The cover 20 covers the circuit device 18. Note that the arrow Z direction, the arrow R direction, and the arrow C direction respectively indicate a rotation axis direction, a rotation radial direction, and a rotation circumferential direction of the rotor 14 in the drawings, as appropriate. Further, in the following, unless specifically stated otherwise, simple reference to the axis direction, the radial direction, or the circumferential direction refers to the rotation axis direction, the rotation radial direction, and the rotation circumferential direction of the rotor 14.

Stator 12 Configuration

Figure 2:
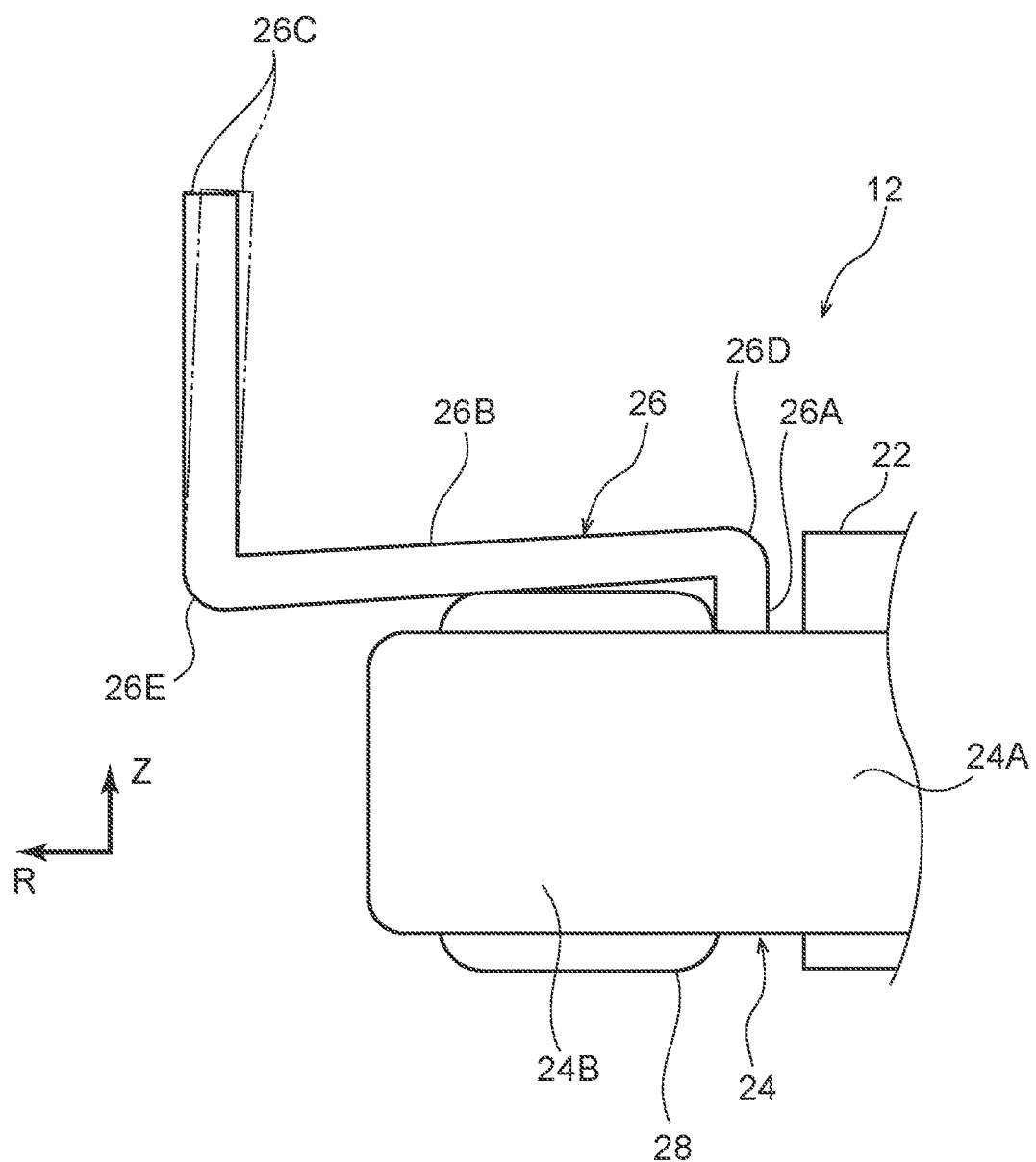
FIG. 2 is an enlarged side view schematically illustrating a portion of a stator.

As illustrated in FIG. 1 and FIG. 2, the stator 12 is configured by wrapping the windings 26 around predetermined locations of a stator core 24 that is formed from a magnetic metal with an insulator 22 attached thereto.

The stator core 24 includes an annular section 24A formed in a ring shape and plural (twelve in the present exemplary embodiment) teeth 24B. The teeth 24B project toward the radial direction outside from an outer circumferential portion of the annular section 24A, and are disposed at even intervals around the circumferential direction. The windings 26 are wound around each of the respective teeth 24B. The windings 26 each include an insulating covering layer on the surface of a conductive member that has been formed into a linear shape (wire shape). A coil 28 is thus respectively formed around each of the teeth 24B.

As illustrated in FIG. 2, in each of the windings 26 that are formed into the coils 28, a section of the windings 26 leading out from the stator core 24 side is bent into a predetermined shape (roughly an N-shape). Specifically, the section of each winding 26 leading out from the stator core 24 side includes a first extension 26A and a second extension 26B. The first extension 26A extends toward one side in the axis direction of the stator core 24. The second extension 26B extends toward the radial direction outside from an end on the one axis direction side of the first extension 26A, and is inclined toward the other side in the axis direction on progression toward the radial direction outside. The section of each winding 26 leading out from the stator core 24 side also includes a third extension 26C. The third extension 26C extends toward the one axis direction side from a radial direction outside end of the second extension 26B, and an end of the third extension 26C on the one axis direction side is connected by solder to a circuit board 44 (see FIG. 3) configuring part of the circuit device 18. In the present exemplary embodiment, an inner bent portion 26D at a boundary between the first extension 26A and the second extension 26B is disposed at the one axis direction side of an outer bent portion 26E at a boundary between the second extension 26B and the third extension 26C.

Rotor 14 Configuration

As illustrated in FIG. 1, the rotor 14 is configured including a rotor housing 30 formed in substantially a bottomed circular cylinder shape and a rotor magnet 32 fixed to the rotor housing 30. The rotor housing 30 includes a bottom wall 30A formed in a disc shape and a circumferential wall 30B. The circumferential wall 30B is bent so as to extend toward the one axis direction side from an outer circumferential edge of the bottom wall 30A. The rotor magnet 32 is fixed to the radial direction inside face of the circumferential wall 30B. A pair of bearings 34 are fixed to an axial center portion of the rotor housing 30 by press fitting or the like. The pair of bearings 34 are inserted into an axial member 36 fixed to the centerpiece 16, described below. The rotor housing 30 is thus supported by the axial member 36 through the pair of bearings 34, such that the rotor magnet 32 fixed to the rotor housing 30 and the stator 12 are disposed facing each other in the radial direction.

Centerpiece 16 Configuration

The centerpiece 16, serving as a first member, is formed from an aluminum alloy or the like. A boss portion 16A is provided to the centerpiece 16 so as to project toward the other axis direction side. The axial member 36 is fixed into the boss portion 16A by press fitting. The stator 12 is fixed to the other axis direction side of the centerpiece 16 by, for example, stator fixing bolts 38. Moreover, the circuit device 18, described below, is fixed to the one axis direction side of the centerpiece 16 by circuit device fixing bolts 40. A groove 16B applied with a sealant 50 (see FIG. 9), described below, is formed in the centerpiece 16 on an outer circumferential portion on the other axis direction side of the centerpiece 16.

Figure 3:
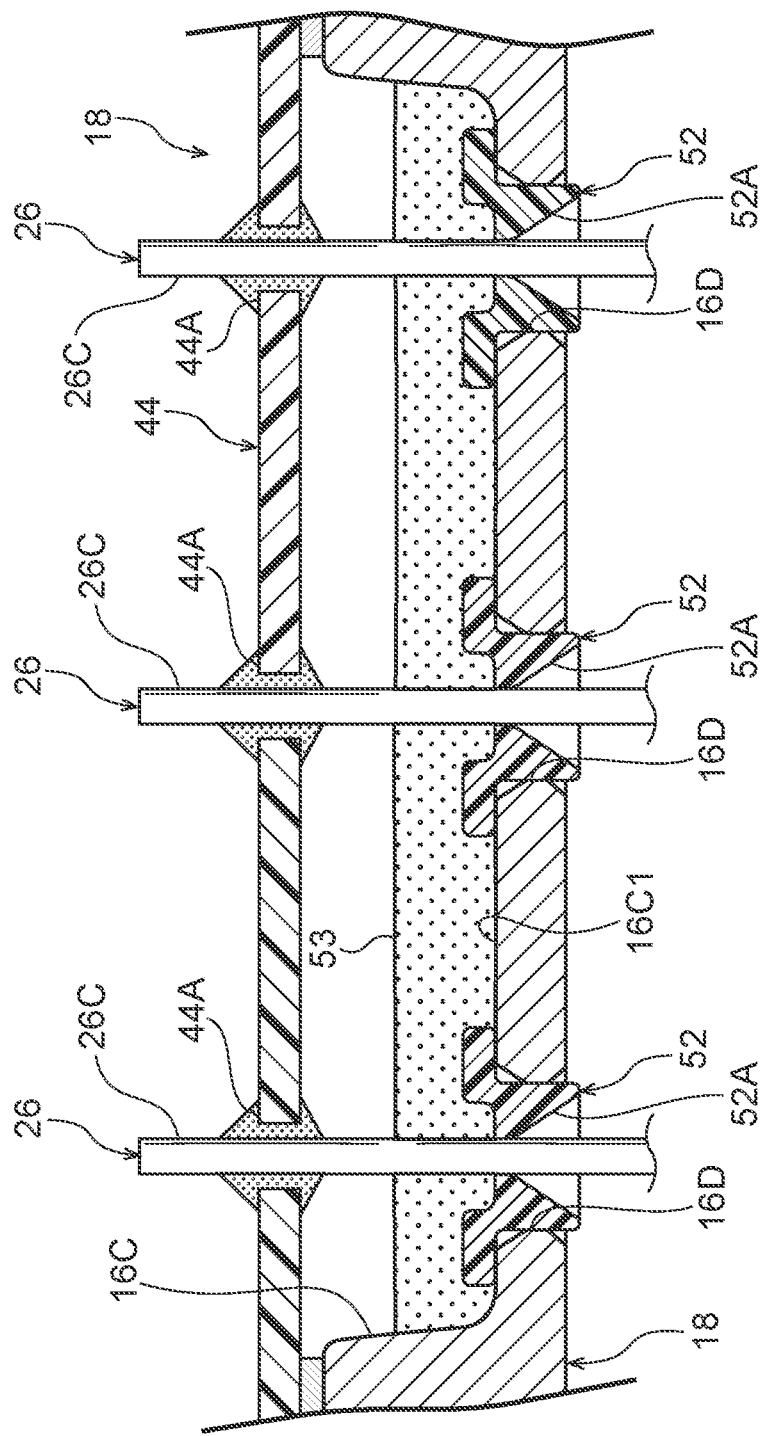
FIG. 3 is an enlarged cross-section illustrating a portion of a centerpiece where terminal ends of windings are inserted.
Figure 4:
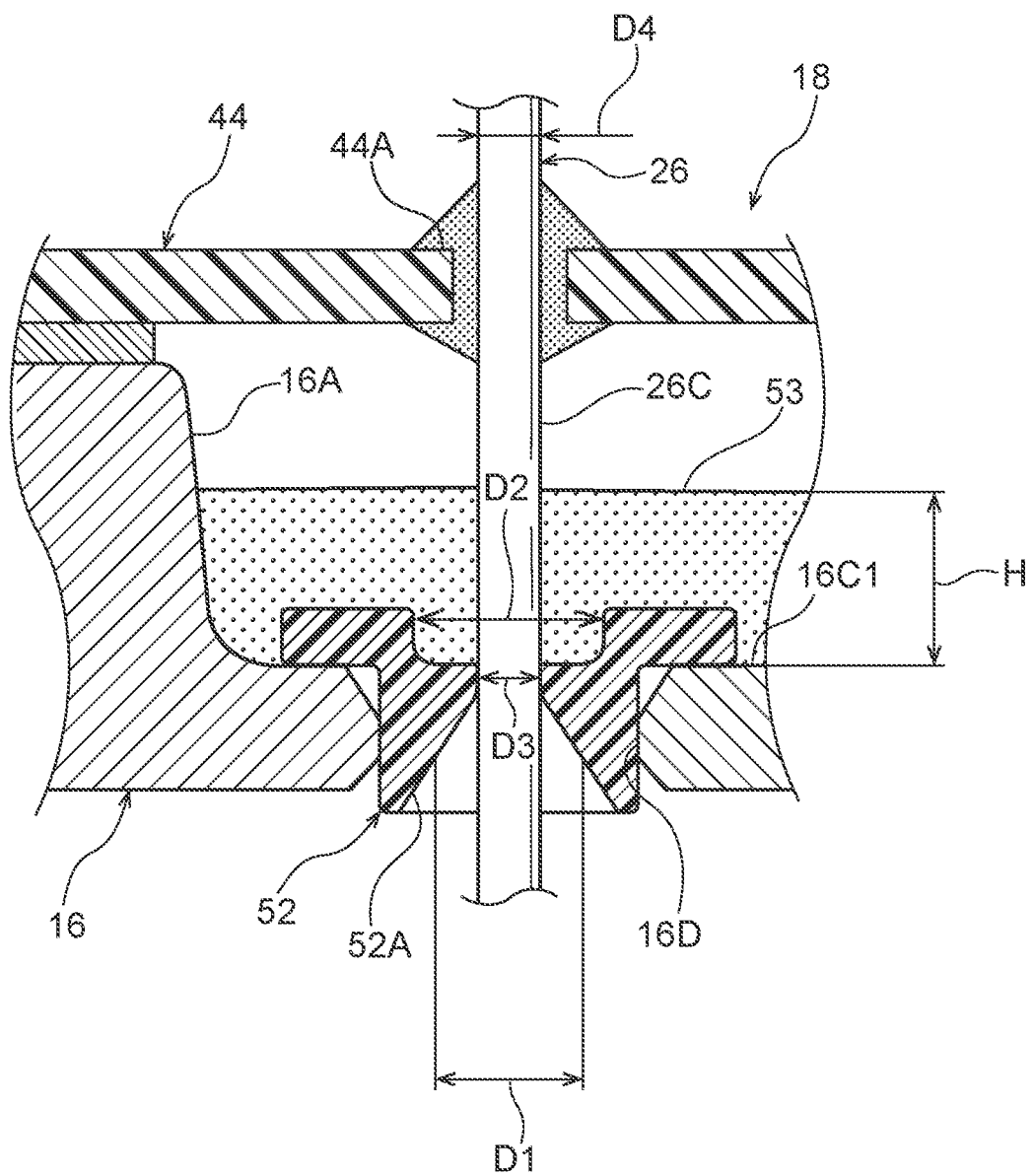
FIG. 4 is an enlarged cross-section illustrating a portion of a centerpiece where a terminal end of a winding is inserted, enlarged further than in FIG. 3.

As illustrated in FIG. 3 and FIG. 4, an elongated recess 16C is formed in the centerpiece 16. The elongated recess 16C is open toward the one axis direction side, and is curved in a bow shape as viewed along the axial direction. Plural (three in the present exemplary embodiment) centerpiece-side winding insertion holes 16D are formed in the bottom 16C1 of the recess 16C. The third extensions 26C of the windings 26 are inserted through the centerpiece-side winding insertion holes 16D. The plural centerpiece-side winding insertion holes 16D formed in the bottom 16C1 of the recess 16C are disposed spaced apart along the length direction of the recess 16C. Note that the recess 16C and the centerpiece-side winding insertion holes 16D of the same number as the number of the third extensions 26C of the windings 26 are formed in the centerpiece 16.

Figure 5:
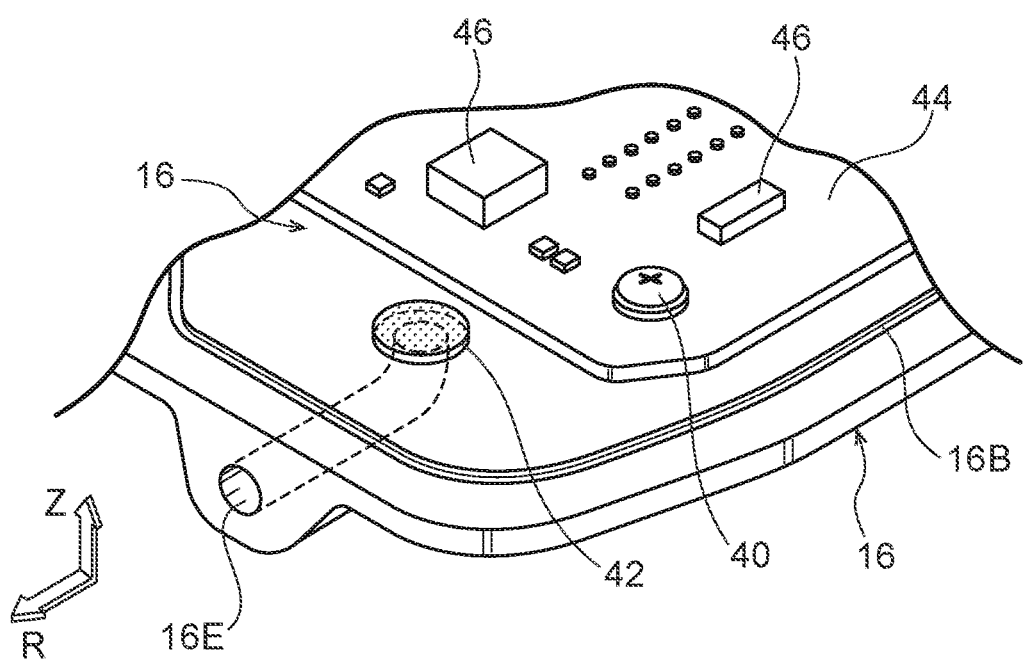
FIG. 5 is an enlarged perspective view illustrating a portion of a centerpiece where a communication hole is provided.

As illustrated in FIG. 5, a communication hole 16E is formed in an outer circumferential portion of the centerpiece 16. The communication hole 16E places a space between the centerpiece 16 and the cover 20, this being a space where the circuit device 18 is disposed (see FIG. 1), in communication with the space outside this space. One side of the communication hole 16E opens toward the one axis direction side onto the space where the circuit device 18 is disposed. The other side of the communication hole 16E opens toward the radial direction outside onto the space outside of the space where the circuit device 18 is disposed. The end of the communication hole 16E on the side of the space where the circuit device is disposed is closed off by a filter 42 that is formed from a material that is gas-permeable but does not let liquid readily pass through. Note that GORETEX (registered trademark) or the like is an example of a material that may be employed for the filter 42.

Circuit Device 18 Configuration

As illustrated in FIG. 1 and FIG. 5, the circuit device 18 is disposed on the opposite side of the centerpiece 16 to the side on which the stator 12 is fixed. The circuit device 18 is configured including the circuit board 44 and plural circuit elements 46 that configure a control circuit to control current flow to the stator 12 (windings 26).

The circuit board 44 is formed in a rectangular sheet shape with its thickness direction along the axis direction. The circuit board 44 is configured by conductive patterns formed on a board body formed from an insulating material. As illustrated in FIG. 3 and FIG. 4, connection portions 44A are provided on the circuit board 44. Ends of the third extensions 26C of the windings 26 that have passed through the centerpiece-side winding insertion holes 16D formed in the centerpiece 16 are connected by solder to the connection portions 44A. Note that power is supplied to the circuit board 44 through a connector 48 attached to the centerpiece 16 (see FIG. 1).

Cover 20 Configuration

As illustrated in FIG. 1, the cover 20, serving as a second member, is formed in the shape of a bottomed box that is open at the side of the centerpiece 16. The cover 20 is joined to the centerpiece 16 using the interposed sealant 50 (see FIG. 9), so as to form the space the circuit device 18 is disposed in between the cover 20 and the centerpiece 16. Specifically, the cover 20 includes a bottom wall 20A, a side wall 20B, and a flange 20C. The bottom wall 20A extends in the radial direction and faces the circuit board 44 fixed to the centerpiece 16 along the axis direction. The side wall 20B is bent so as to extend from an outer circumferential edge of the bottom wall 20A toward the centerpiece 16. The flange 20C extends toward the radial direction outside from the centerpiece-16-side end of the side wall 20B. The flange 20C is formed with a protrusion 20D that corresponds to the groove 16B formed in the centerpiece 16.

Cap 52 Configuration

As illustrated in FIG. 4, a cap 52 formed from an insulating material is attached to a peripheral edge of each of the centerpiece-side winding insertion holes 16D in the centerpiece 16. Each cap 52 is tube shaped and formed with a cap-side winding insertion hole 52A at the axial center thereof. The third extension 26C of the respective winding 26 is inserted into the cap-side winding insertion hole 52A.

A portion on the stator 12 side (on the other axis direction side) of the cap-side winding insertion hole 52A is formed with a funnel shape that gradually narrows on progression toward the one axis direction side. An inner diameter D1 of the other-axis-direction-side portion of the cap-side winding insertion hole 52A thus gradually decreases on progression toward the one axis direction side. An inner diameter D2 of a portion on the circuit device 18 side (on the one axis direction side) of the cap-side winding insertion hole 52A is set as a larger inner diameter than an inner diameter D3 of an axis direction central portion of the cap-side winding insertion hole 52A. Note that the inner diameter D3 of the axis direction central portion of the cap-side winding insertion hole 52A is an inner diameter substantially the same as an outer diameter D4 of the windings 26.

Potting Section 53 Configuration

As illustrated in FIG. 3 and FIG. 4, in the present exemplary embodiment, slight gaps formed between the centerpiece-side winding insertion holes 16D and the caps 52, and slight gaps formed between the caps 52 and the windings 26 are sealed by forming a potting section 53 in the recess 16C formed in the centerpiece 16. Note that the potting material to form the potting section 53 with is a silicone resin that cures readily by irradiation with ultraviolet rays.

As illustrated in FIG. 3, in the present exemplary embodiment, a single potting section 53 is formed in the recess 16C by pouring the silicone resin into the recess 16C formed in the centerpiece 16 and then irradiating ultraviolet rays onto the silicone resin poured into the recess 16C. Each of the gaps formed at the peripheral edges of the three centerpiece-side winding insertion holes 16D formed in the bottom 16C1 of the recess 16C are thus sealed by the single potting section 53. Note that an axis direction height (depth) H of the potting section 53 with respect to the bottom 16C1 of the recess 16C is set to a height such that the cap 52 is not exposed from the potting section 53.

Method of Forming Winding Terminal Ends

Explanation follows regarding a method of forming the section leading out from the stator core 24 side in each of the windings 26 formed into the coils 28, with reference to FIG. 6 and FIG. 7.

Figure 6A:
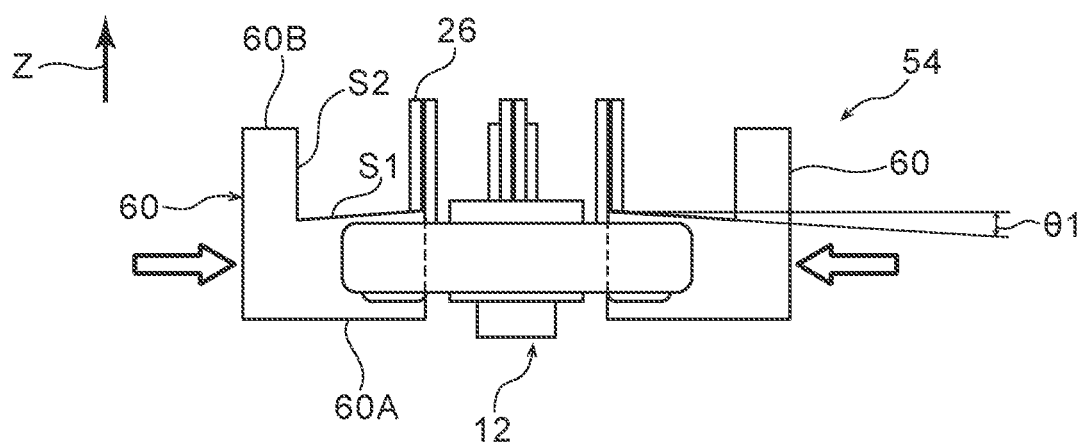
FIG. 6A is a side view schematically illustrating a process for applying pressure to terminal ends of windings, and illustrates a backup insertion process.
Figure 6B:
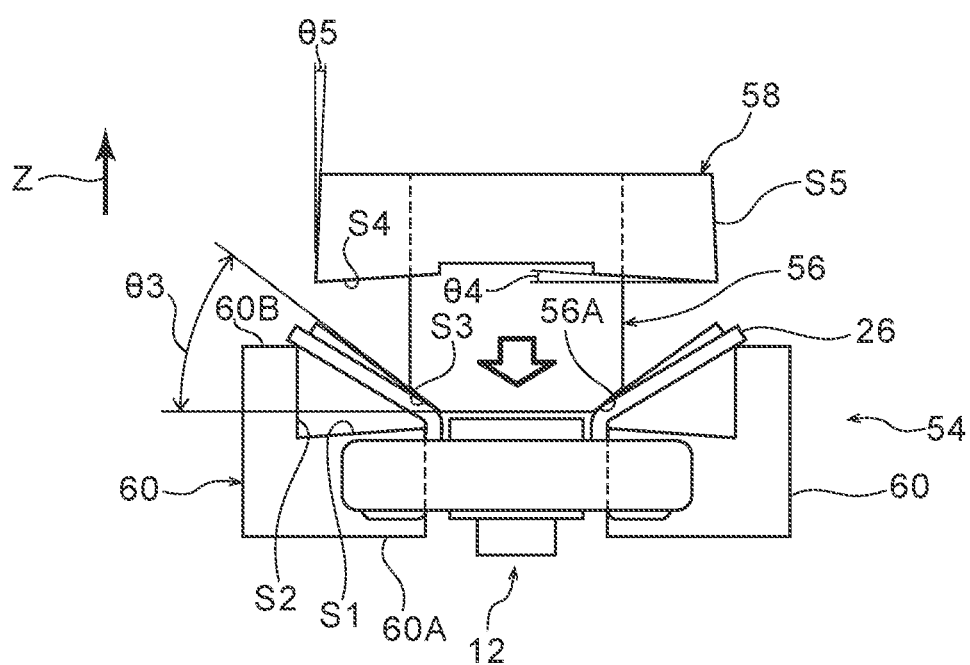
FIG. 6B is a side view schematically illustrating a process for applying pressure to terminal ends of windings, and illustrates a bending process using a first bending jig.
Figure 6C:
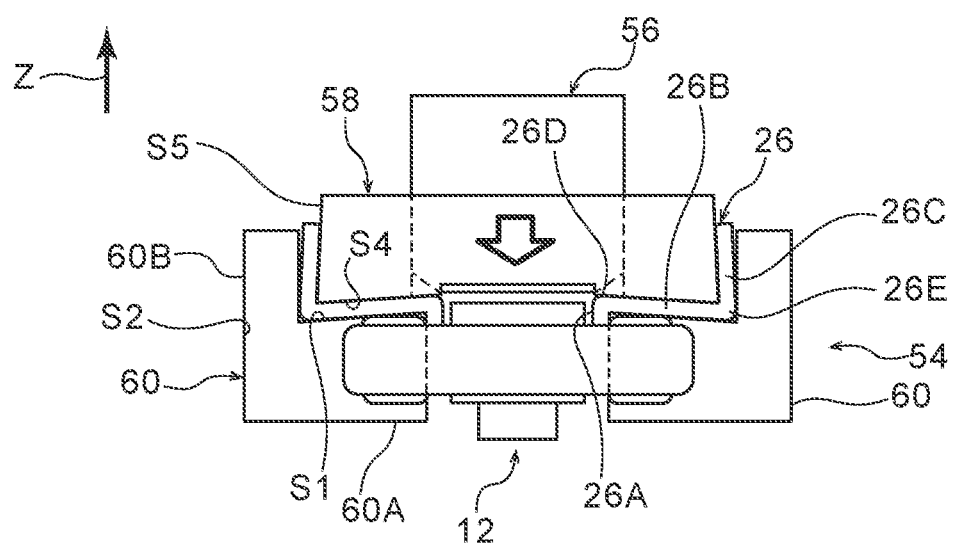
FIG. 6C is a side view schematically illustrating a process for applying pressure to terminal ends of windings, and illustrates a bending process using a second bending jig.
Figure 7A:
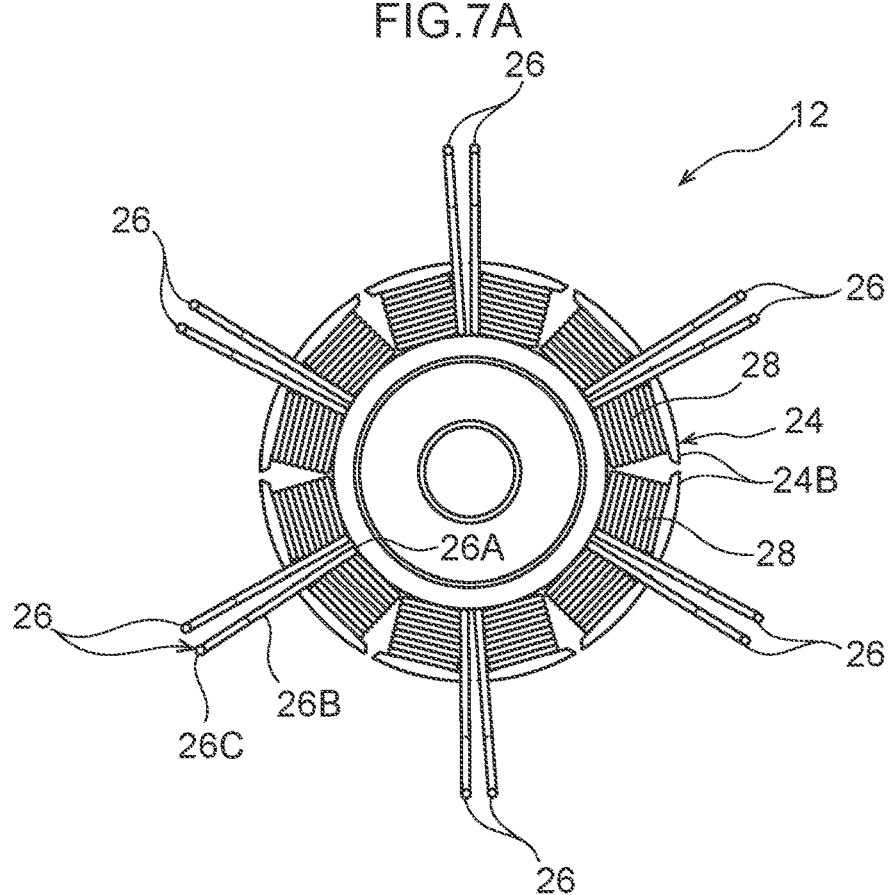
FIG. 7A is a bottom view illustrating a stator after completion of the bending process using the second bending jig.

As illustrated in FIG. 6A to FIG. 6C, in the present exemplary embodiment, the section leading out from the stator core 24 side in each of the windings 26 formed into the coils 28 is bent into a predetermined shape using a pressing apparatus. The pressing apparatus is configured including a backup 54 that is inserted between the respective teeth 24B of the stator core 24, and a first bending jig 56 and a second bending jig 58. The windings 26 are sandwiched between the backup 54, and the first bending jig 56 and the second bending jig 58.

The backup 54 is configured by plural backup configuration blocks 60 that are divided from each other in the circumferential direction. The backup configuration blocks 60 each includes an inter-tooth insertion portion 60A and an outer circumferential wall portion 60B. The inter-tooth insertion portion 60A includes a portion that is disposed between the respective teeth 24B. The outer circumferential wall portion 60B extends toward the one axis direction side from the radial direction outer side of the inter-tooth insertion portion 60A. Each backup configuration block 60 is thus formed in substantially an L-shape in side view (as viewed from the radial direction outside). A surface S1 on the one-axis-direction-side of the inter-tooth insertion portion 60A is inclined toward the other axis direction side on progression toward the radial direction outside. The angle θ1 of the surface S1 on the one-axis-direction-side of each inter-tooth insertion portion 60A is, for example, set to approximately 4 degrees with respect to the radial direction. A surface S2 on the radial direction inner side of the outer circumferential wall portion 60B extends along the axis direction.

The first bending jig 56 is formed in substantially a circular column shape. A radial direction outside end at the other-axis-direction-side of the first bending jig 56 is configured with a tapered portion 56A that becomes narrower on progression toward the other axis direction side. An inclination angle θ3 of an outer circumferential surface S3 of the tapered portion 56A is set to approximately 45 degrees with respect to the radial direction.

The second bending jig 58 is formed in an annular block shape, into which the first bending jig 56 is inserted. A surface S4 on the other-axis-direction-side of the second bending jig 58 corresponds to the surface S1 on the one-axis-direction-side of the inter-tooth insertion portions 60A of the backup configuration blocks 60. Namely, an inclination angle θ4 of the surface S4 on the other-axis-direction-side of the second bending jig 58 is set to approximately 4 degrees with respect to the radial direction. A surface S5 on the radial direction outer side of the second bending jig 58 is slightly inclined with respect to the surface S2 on the radial direction inner side of the outer circumferential wall portion 60B of each backup configuration block 60. Namely, an inclination angle θ5 of the surface S5 on the radial direction outer side of the second bending jig 58 is set so as to be inclined by approximately 1.5 degrees toward the radial direction inside with respect to the axis direction. The inclination angle θ5 is set in consideration of spring back of the windings 26 from the state illustrated using double-dotted dashed lines to the state illustrated using solid lines in FIG. 2.

As illustrated in FIG. 6A, in a state after a coil forming process has been performed, in each of the windings 26 formed into the coils 28, the section thereof that leads out from the stator core 24 side extends in a straight line toward the one axis direction side. After the stator 12 has been set in this state in the pressing apparatus, each of the backup configuration blocks 60 is moved toward the radial direction inside. Part of the inter-tooth insertion portion 60A of each backup configuration block 60 is thus disposed between respective teeth 24B of the stator core 24.

Next, as illustrated in FIG. 6B, the first bending jig 56 is moved toward the other axis direction side. The base end side (the other axis direction side) of the section leading out from the stator core 24 side of each of the windings 26 formed into the coils 28 is thereby pressed against the outer circumferential surface S3 of the tapered portion 56A of the first bending jig 56. This causes the section leading out from the stator core 24 side of each of the windings 26 formed into the coils 28 to be inclined at an angle corresponding to the outer circumferential surface S3 of the tapered portion 56A (i.e. approximately 45 degrees with respect to the axis direction).

Next, as illustrated in FIG. 6C, the second bending jig 58 is moved toward the other axis direction side. The section leading out from the stator core 24 side of each of the windings 26 formed into the coils 28 is thereby interposed and pressed between the other-axis-direction-side surface S4 and the radial-direction-outer-side surface S5 on the second bending jig 58, and the one-axis-direction-side surface S1 of the inter-tooth insertion portion 60A and the radial-direction-inner-side surface S2 of the outer circumferential wall portion 60B on the respective backup configuration block 60 (a winding bending process). The section leading out from the stator core 24 side of each of the windings 26 formed into the coils 28 is bent into the state illustrated in FIG. 7A by these processes.

Figure 7B:
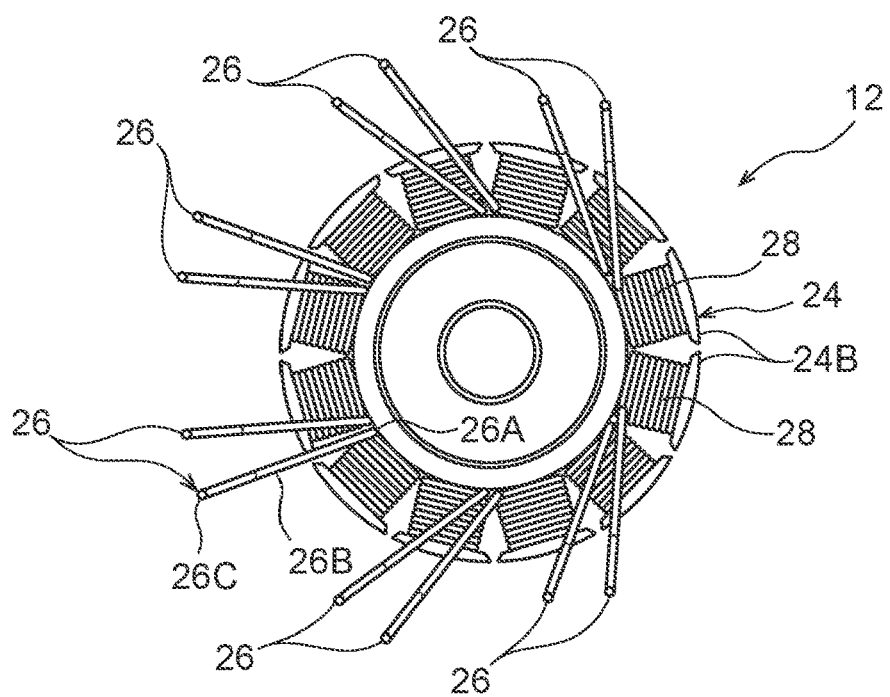
FIG. 7B is a bottom view illustrating a stator after completion of a winding turning process.
Figure 8A:
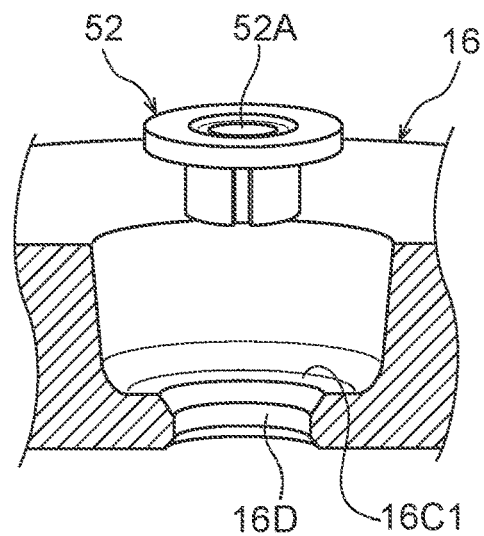
FIG. 8A is a perspective cross-section illustrating a process to attach a cap to a centerpiece.
Figure 8B:
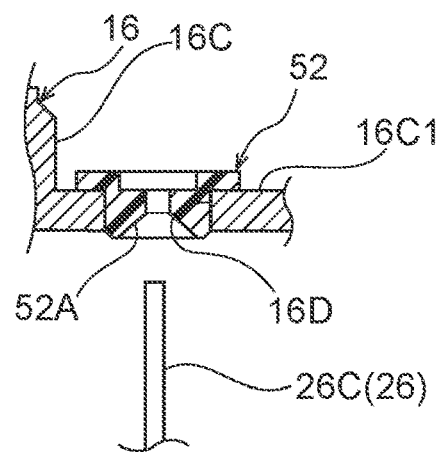
FIG. 8B is a side view cross-section illustrating a process to insert a winding through a centerpiece-side winding insertion hole formed in a centerpiece and through a cap-side winding insertion hole formed in a cap.
Figure 8C:
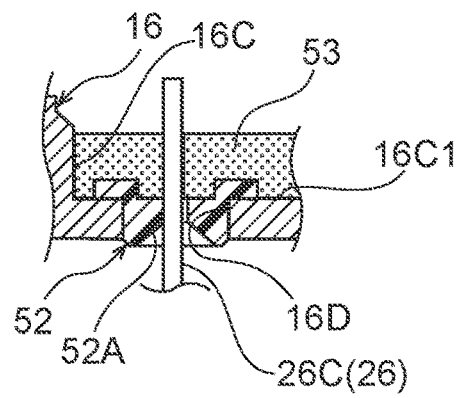
FIG. 8C is a side view cross-section illustrating a process to insert a winding through a centerpiece-side winding insertion hole formed in a centerpiece and through a cap-side winding insertion hole formed in a cap.

Further, after this winding bending process has been performed, the second extension 26B of each of the windings 26 is caused to swing about the third extension 26C such that, as illustrated in FIG. 7B, the third extensions 26C are disposed at positions corresponding to the centerpiece-side winding insertion holes 16D (see FIG. 3) formed in the centerpiece 16 (a winding turning process). Then, as illustrated in FIG. 8A and FIG. 8B, when attaching the stator 12 to the centerpiece 16, to which the cap 52 has already been attached, the third extension 26C of each winding 26 is inserted through the centerpiece-side winding insertion holes 16D formed in the centerpiece 16 and through the cap-side winding insertion hole 52A formed in the respective cap 52 (a stator attaching process). Then, as illustrated in FIG. 8C, the potting section 53 is formed inside the recess 16C by pouring silicone resin into the recess 16C formed in the centerpiece 16 and irradiating ultraviolet rays onto the silicone resin poured into the recess 16C (a potting section forming process). Then, as illustrated in FIG. 3, the third extension 26C of each winding 26 is connected by solder to the circuit board 44 configuring part of the circuit device 18 (a winding connection process).

Cover Attachment Process

Figure 9:
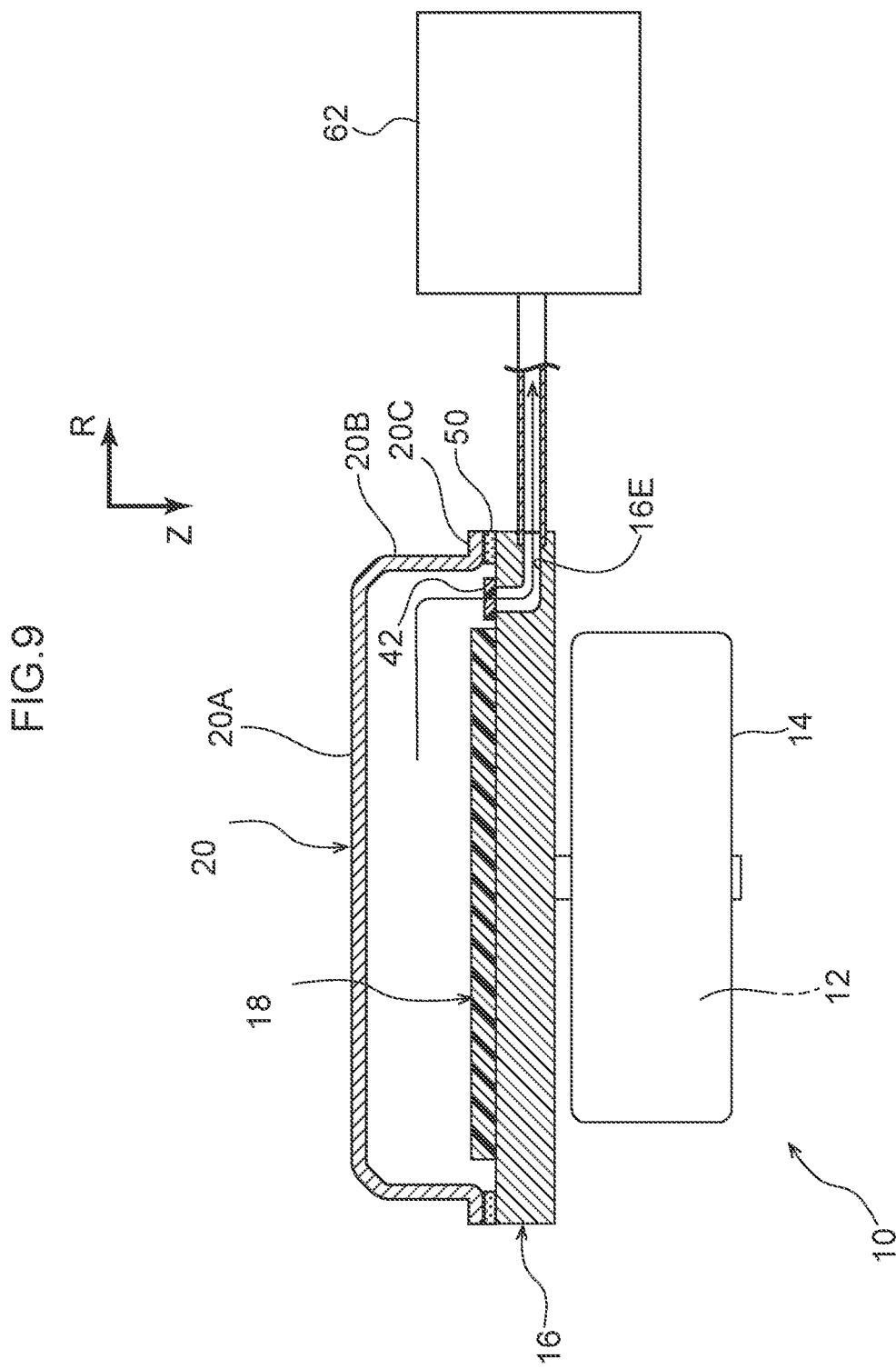
FIG. 9 is a side view cross-section illustrating a process to attach a cover to a centerpiece.

Explanation follows regarding a process for attaching the cover 20 to the centerpiece 16, with reference to FIG. 9. Note that the groove 16B formed in the centerpiece 16 and the protrusion 20D formed to the flange 20C of the cover 20 are omitted from illustration in FIG. 9.

As illustrated in FIG. 9, first, a suction pump 62 is connected to the communication hole 16E formed in the centerpiece 16 (a pump connecting process).

Next, the sealant 50 is poured into the groove 16B (see FIG. 1) formed in the centerpiece 16. Note that the amount of sealant 50 poured into the groove 16B is an amount such that the sealant 50 projects out of the open end of the groove 16B. A portion corresponding to the groove 16B may be formed on the flange 20C of the cover 20, and the sealant 50 applied to this portion corresponding to the groove 16B.

Next, the suction pump 62 is actuated to join the flange 20C of the cover 20 to the portion applied with the sealant 50 on the centerpiece 16 while air on the circuit device 18 side of the communication hole 16E is sucked through the communication hole 16E (a joining process).

The motor unit 10 of the present exemplary embodiment is manufactured through the processes described above and other processes.

Operation of Present Exemplary Embodiment

Explanation follows regarding the operation of the present exemplary embodiment.

As illustrated in FIG. 1, in the motor unit 10 of the present exemplary embodiment, current flow to the stator 12 (windings 26) is controlled by the circuit device 18 such that the stator 12 generates a rotating magnetic field. The rotor 14 is rotated by interaction between the rotating magnetic field and the magnetic field of the rotor magnet 32.

In the motor unit 10 of the present exemplary embodiment, as illustrated in FIG. 3, the third extension 26C of each of the windings 26 is inserted through the centerpiece-side winding insertion holes 16D formed in the centerpiece 16 that supports the stator 12, and through the cap-side winding insertion hole 52A formed in the respective cap 52. Slight gaps formed between the centerpiece-side winding insertion holes 16D and the caps 52 and slight gaps between the cap 52 and the windings 26 are sealed due to the potting section 53 being formed in the recess 16C formed in the centerpiece 16. Water droplets adhering to the stator 12 side can thereby be suppressed from flowing past the peripheral edges of the centerpiece-side winding insertion holes 16D and infiltrating through to the circuit device 18 side. In particular, since the potting section 53 is closely adhered to the covering layer of the windings 26 in the present exemplary embodiment, it is possible to achieve a good state of joining between the potting section 53 and the windings 26. This enables water droplets adhered to the stator 12 side to be suppressed from infiltrating through between the potting section 53 and the winding 26 to the circuit device 18 side.

Moreover, a configuration is adopted in the present exemplary embodiment in which gaps at the peripheral edges of the plural (three) third extensions 26C are sealed by the single potting section 53. This enables good work efficiency to be achieved when forming the potting section 53 to seal the gaps.

Moreover, since the centerpiece-side winding insertion holes 16D are formed in the bottom of the recess 16C formed in the centerpiece 16 in the present exemplary embodiment, the potting material for forming the potting section 53 can be held in the recess 16C. This enables good work efficiency to be achieved when forming the potting section 53 to seal the gaps formed between the centerpiece-side winding insertion holes 16D and the windings 26.

Further, adopting a configuration in the present exemplary embodiment in which plural of the centerpiece-side winding insertion holes 16D are formed in the bottom of a single recess 16C enables even better work efficiency to be achieved when forming the potting section 53 to seal the gaps formed between the centerpiece-side winding insertion holes 16D and the windings 26.

Further, providing the insulating caps 52 between the centerpiece-side winding insertion holes 16D and the windings 26 in the present exemplary embodiment enables a state of insulation between the windings 26 and the peripheral edges of the centerpiece-side winding insertion holes 16D to be easily secured. Further, forming the portion on the stator 12 side of the cap-side winding insertion hole 52A formed in each cap 52 with the inner diameter D1 that is smaller on progression from the stator 12 side toward the circuit device 18 side enables the windings 26 to be easily inserted through from the stator 12 side to the circuit device 18 side.

Figure 10:
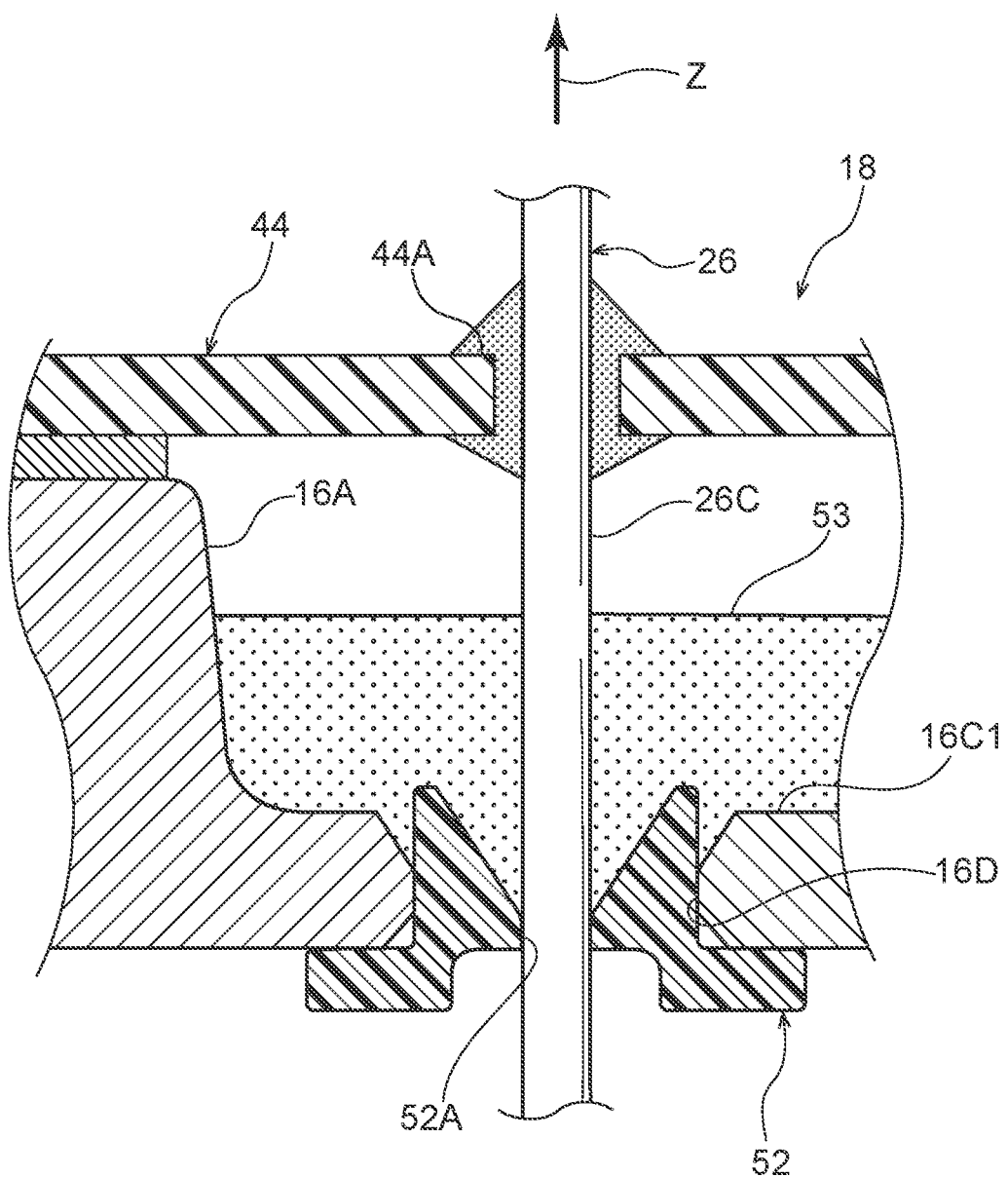
FIG. 10 is an enlarged cross-section corresponding to FIG. 3 and illustrating a cap etc. attached from the opposite side to the direction illustrated in FIG. 3.

Further, forming the portion on the circuit device 18 side of the cap-side winding insertion hole 52A formed in each cap 52 with the inner diameter D2 that is larger than the inner diameter D3 of the axis direction central portion of the cap-side winding insertion hole 52A in the present exemplary embodiment enables an increase in the contact area between the potting section 53 and the covering layer formed on the windings 26. This enables the strength of the join between the potting section 53 and covering layer formed on the windings 26 to be increased. Note that as illustrated in FIG. 10, the contact area between the potting section 53 and covering layer formed on the windings 26 may also be increased by attaching the caps 52 to the centerpiece 16 in a state in which the caps 52 are inverted in the axis direction.

Note that although in the present exemplary embodiment, as illustrated in FIG. 3, explanation was given of an example of a configuration in which the portion on the stator 12 side of each of the cap-side winding insertion holes 52A is formed in a funnel shape in which the inner diameter D1 of the other-axis-direction-side portion of the cap-side winding insertion hole 52A gradually becomes smaller on progression toward the one axis direction side, the present disclosure is not limited thereto. For example, as illustrated in FIG. 11, the portion on the stator 12 side of each cap-side winding insertion hole 52A may be formed in a funnel shape in which an axis direction intermediate portion of this portion is configured with an inflection. Further, as illustrated in FIG. 12, the portion on the stator 12 side of each cap-side winding insertion hole 52A may be formed in a funnel shape in which the inner circumferential face thereof is configured with a gentle curve.

Note that although explanation was given in the present exemplary embodiment of an example in which the caps 52 are attached to the centerpiece 16, the present disclosure is not limited thereto. For example, configuration may be such that the peripheral edge of each of the centerpiece-side winding insertion holes 16D formed in the centerpiece 16 is configured similarly to a cap, and a cap 52 is not provided.

As illustrated in FIG. 2, in the stator 12 configuring part of the motor unit of the present exemplary embodiment, the inner bent portion 26D at the boundary between the first extension 26A and the second extension 26B of each of the windings 26 is disposed at the one axis direction side of the outer bent portion 26E at the boundary between the second extension 26B and the third extension 26C. This enables locations of the stator 12 at the rotor rotation radial direction outside to be disposed closer to the centerpiece 16 than in configurations in which the inner bent portion 26D and the outer bent portion 26E are disposed at the same position along the rotation axis direction. As a result, the build shape of the motor unit 10 along the rotation axis direction can be suppressed from becoming more bulky.

Further, in the present exemplary embodiment, the second extension 26B, this being a location between the first extension 26A and the third extension 26C of each of the windings 26, is inclined toward the other axis direction side on progression toward the radial direction outside. Such configuration enables the length of the second extension 26B to be shorter than in cases in which the second extension 26B is curved. This enables the wiring routing for the section of the winding 26 extending from the stator core 24 as far as the circuit device to be suppressed from increasing in length. Note that inclination or no inclination of the second extension 26B as described above may be appropriately set in consideration of the configuration of the portion where the stator 12 is to be fixed to on the centerpiece 16.

Further, in the present exemplary embodiment, after the winding bending process illustrated in FIG. 6A to FIG. 6C has been performed, when the stator 12 is being attached to the centerpiece 16 via the winding turning process illustrated in FIG. 7B, the third extension 26C of each of the windings 26 can be easily inserted through the respective centerpiece-side winding insertion hole 16D formed in the centerpiece 16, and through the respective cap-side winding insertion hole 52A formed in the cap 52. Note that the incorporation or not of the winding turning process into the processes for manufacturing a motor unit may be selected in consideration of the arrangement of the centerpiece-side winding insertion holes 16D formed in the centerpiece 16.

As illustrated in FIG. 1, in the motor unit 10 of the present exemplary embodiment, the circuit device 18 is disposed inside the space formed between the centerpiece 16 and the cover 20. Further, the sealant 50 is interposed between the centerpiece 16 and the cover 20. Water droplets are thereby suppressed from infiltrating into the space where the circuit device 18 is disposed between the centerpiece and the cover.

Note that when the cover 20 is being attached to the centerpiece 16 in a state in which the sealant 50 has been applied to the centerpiece 16, as illustrated in FIG. 9, it is conceivable that the pressure between the centerpiece 16 and the cover 20 will rise when the sealant 50 is being squashed between the cover 20 and the centerpiece 16. Thus the sealant 50 interposed between the centerpiece 16 and the cover 20 might conceivably fly out. Namely, it is conceivable that there will be a loss of sealant 50 at some locations between the centerpiece 16 and the cover 20.

However, in the present exemplary embodiment, the centerpiece is formed with the communication hole 16E that communicates the space formed between the centerpiece 16 and the cover 20 with space on the outside of this space, and also a portion on the side of the outside space is open toward the radial direction outside. This enables the suction pump 62 to be easily connected to a portion on the opposite side of the communication hole 16E to the side on which the circuit device 18 is disposed. Attaching the cover 20 to the centerpiece 16 as air on the circuit device 18 side is being sucked out by the suction pump 62 enables the pressure in the space between the centerpiece 16 and the cover 20 to be suppressed from increasing when the sealant 50 is squashed between the cover 20 and the centerpiece 16. This enables sealant to be interposed between the centerpiece 16 and the cover 20 in a desired state.

Further, in the present exemplary embodiment, an end portion of the communication hole 16E on the side of the space where the circuit device 18 is disposed is closed off by the filter 42 that has the aforementioned properties. With such a configuration, the pressure in the space between the centerpiece 16 and the cover 20 is liable to increase when the sealant 50 is squashed between the cover 20 and the centerpiece 16. However, in the present exemplary embodiment, the cover 20 is attached to the centerpiece 16 as air is being sucked out from the circuit device 18 side using the suction pump 62 connected to the communication hole 16E, and this enables the pressure in the space between the centerpiece 16 and the cover 20 to be suppressed from increasing when the sealant 50 is squashed between the cover 20 and the centerpiece 16. This configuration provided with the filter 42 also enables the sealant 50 to be interposed between the centerpiece 16 and the cover 20 in a desired state.

Note that provision or not of the filter 42 may be selected as appropriate in consideration of the environment for disposing the motor unit 10 in, the orientation of the motor unit 10, and so on.

Explanation has been given regarding an exemplary embodiment of the present disclosure. However, the present disclosure is not limited to the above, and obviously various other modifications may be implemented within a range not departing from the spirit of the present disclosure.

The disclosures of Japanese Patent Application No. 2016-045700 and Japanese Patent Application No. 2016-045701, filed on Mar. 9, 2016, are incorporated in their entirety in the present specification by reference herein.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A motor comprising:
   a centerpiece;
   a rotor that comprises a rotor magnet and that is supported so as to be capable of rotating about an axis;
   a stator that is fixed at the centerpiece; and
   a circuit device that is fixed at an opposite side of the centerpiece to a side on which the stator is fixed, the circuit device having a circuit board configuring a part of the circuit device,
   wherein the stator comprises
      a stator core disposed facing the rotor magnet along a rotation radial direction of the rotor, and
      a winding including
         a first extension that extends with respect to the stator core toward one side in a rotation axis direction of the rotor,
         a second extension that extends toward a rotation radial direction outside of the rotor from an end of the first extension on the one side in the rotation axis direction of the rotor, and
         a third extension that extends toward the one side in the rotation axis direction of the rotor from an end at the rotor rotation radial direction outside of the second extension, and that passes through an insertion hole formed in the centerpiece such that an end of the third extension on the one side in the rotation axis direction of the rotor is connected to the circuit board, and
      the winding forming a coil around the stator core, and such that
         an inner bent portion which is at a boundary between the first extension and the second extension is disposed at the one side in the rotation axis direction of the rotor with respect to an outer bent portion which is positioned at the rotor rotation radial direction outside with respect to the inner bent portion and which is at a boundary between the second extension and the third extension, the second extension is inclined toward another side in the rotation axis direction of the rotor on progression toward the rotor rotation radial direction outside, and the outer bent portion is disposed at the rotor rotation radial direction outside with respect to a face, which is at the rotor rotation radial direction outside, of the stator core.

2. The motor of claim 1, wherein the face is the most outside face of the stator core in the rotation radial direction of the rotor.

3. The motor of claim 1, wherein the circuit board is formed in a plate shape with a thickness direction of the circuit board being along the rotation axis direction of the rotor.

4. The motor of claim 3, wherein the end of the third extension is connected to the circuit board by solder.

5. The motor of claim 1, wherein the end of the third extension on the one side in the rotation axis direction is disposed at the one side in the rotation axis direction with respect to the inner bent portion.

6. The motor of claim 5, wherein the face is the most outside face of the stator core in the rotation radial direction of the rotor.

7. A method of manufacturing a motor comprising: a centerpiece; a rotor that comprises a rotor magnet and that is supported so as to be capable of rotating about an axis; a stator that is fixed at the centerpiece; and a circuit device that is fixed at an opposite side of the centerpiece to a side on which the stator is fixed, the circuit device having a circuit board configuring a part of the circuit device, wherein the stator comprises a stator core disposed facing the rotor magnet along a rotation radial direction of the rotor, and a winding including a first extension that extends with respect to the stator core toward one side in a rotation axis direction of the rotor, a second extension that extends toward a rotation radial direction outside of the rotor from an end of the first extension on the one side in the rotation axis direction of the rotor, and a third extension that extends toward the one side in the rotation axis direction of the rotor from an end at the rotor rotation radial direction outside of the second extension, and that passes through an insertion hole formed in the centerpiece such that an end of the third extension on the one side in the rotation axis direction of the rotor is connected to the circuit board, the method comprising:
forming a coil by winding the winding around the stator core to form the coil around the stator core;
bending the winding by pressing a section of the coil-forming winding extending out from the stator core so as to form the first extension, the second extension, and the third extension such that
an inner bent portion which is at a boundary between the first extension and the second extension is disposed on the one rotation axis direction side of the rotor with respect to an outer bent portion which is positioned at the rotor rotation radial direction outside with respect to the inner bent portion and which is at a boundary between the second extension and the third extension,
the second extension is inclined toward another side in the rotation axis direction of the rotor on progression toward the rotor rotation radial direction outside, and
the outer bent portion is disposed at the rotor rotation radial direction outside with respect to a face, which is at the rotor rotation radial direction outside, of the stator core; and
connecting the winding by connecting the end of the third extension to the circuit board.

8. The method of manufacturing the motor of claim 7, the method further comprises
turning the winding after bending the winding by swinging the second extension about the third extension so as to dispose the third extension at a position corresponding to the insertion hole, and
attaching the stator to the centerpiece.

9. The method of manufacturing the motor of claim 7, wherein the end of the third extension on the one side in the rotation axis direction is disposed at the one side in the rotation axis direction with respect to the inner bent portion.

10. The method of manufacturing the motor of claim 7, wherein the face is the most outside face of the stator core in the rotation radial direction of the rotor.

11. The method of manufacturing the motor 10, wherein the face is the most outside face of the stator core in the rotation radial direction of the rotor.

\* \* \* \* \*